No. 680,668. Patented Aug. 13, 1901.
A. E. OSBORN.
AUTOMOBILE VEHICLE.
(Application filed Sept. 6, 1900.)
(No Model.) 4 Sheets—Sheet 4.
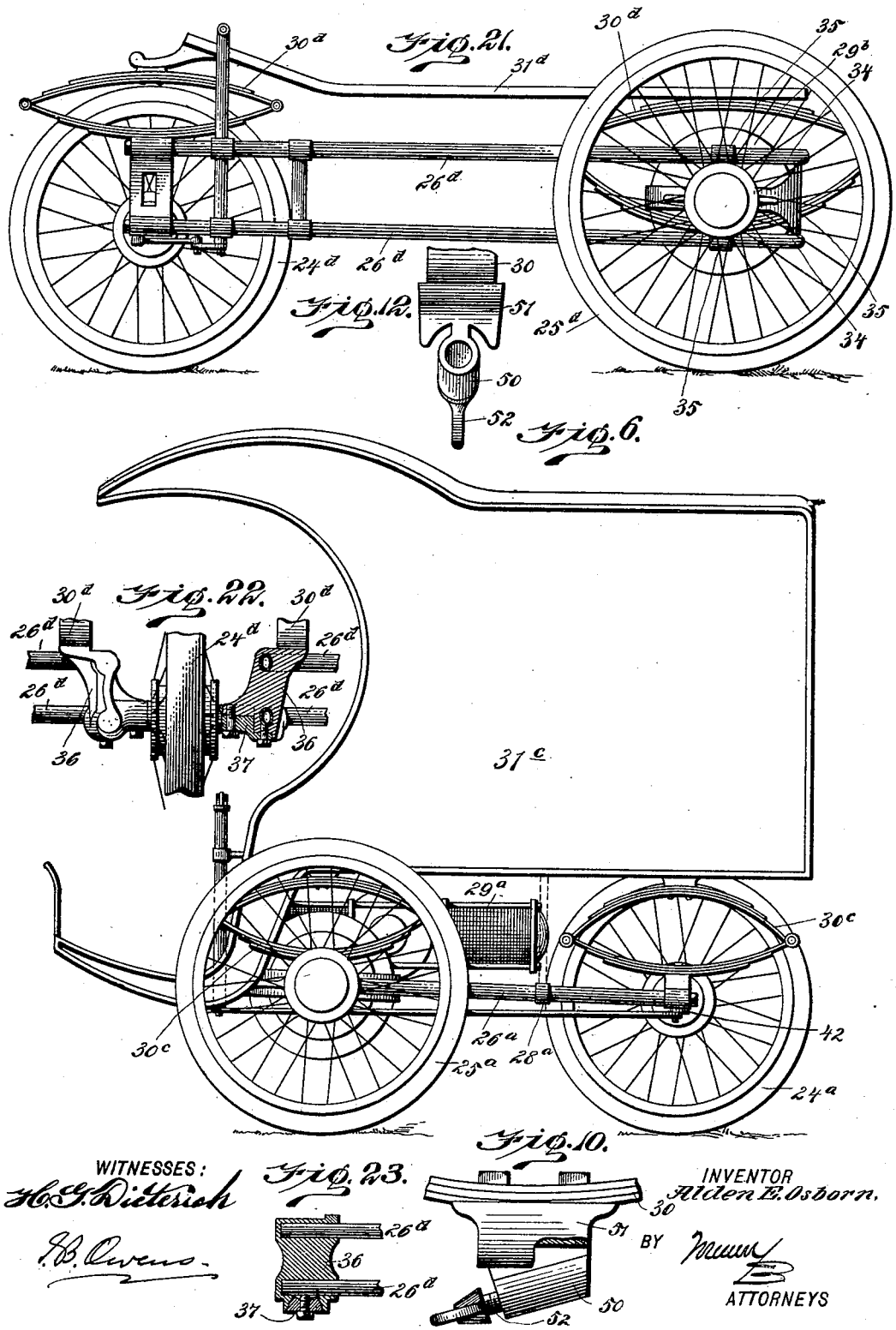
WITNESSES:
INVENTOR
Alden E. Osborn.
BY
ATTORNEYS
THE NORRIS PETERS CO., PHOTO-LITHO., WASHINGTON, D. C.

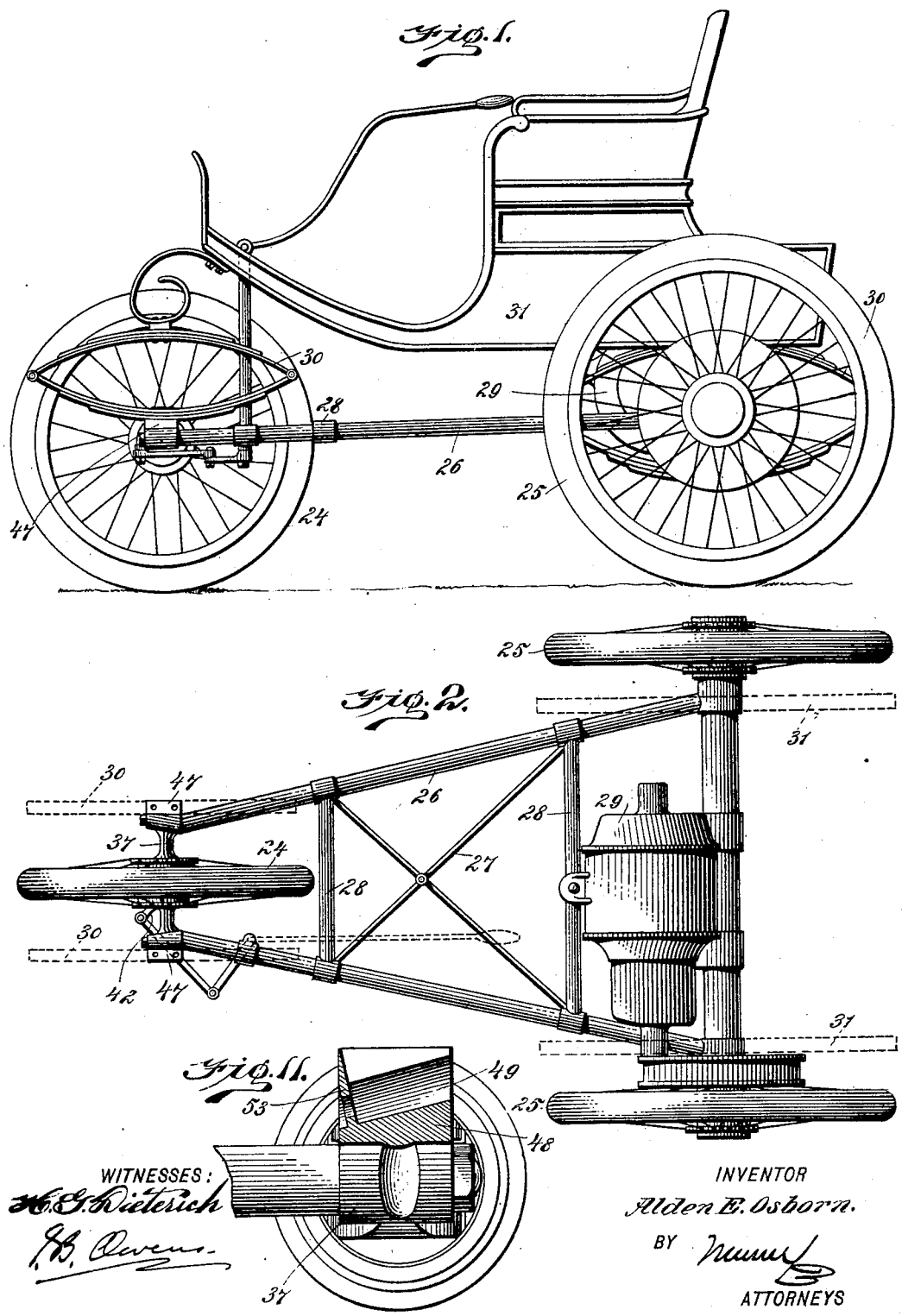

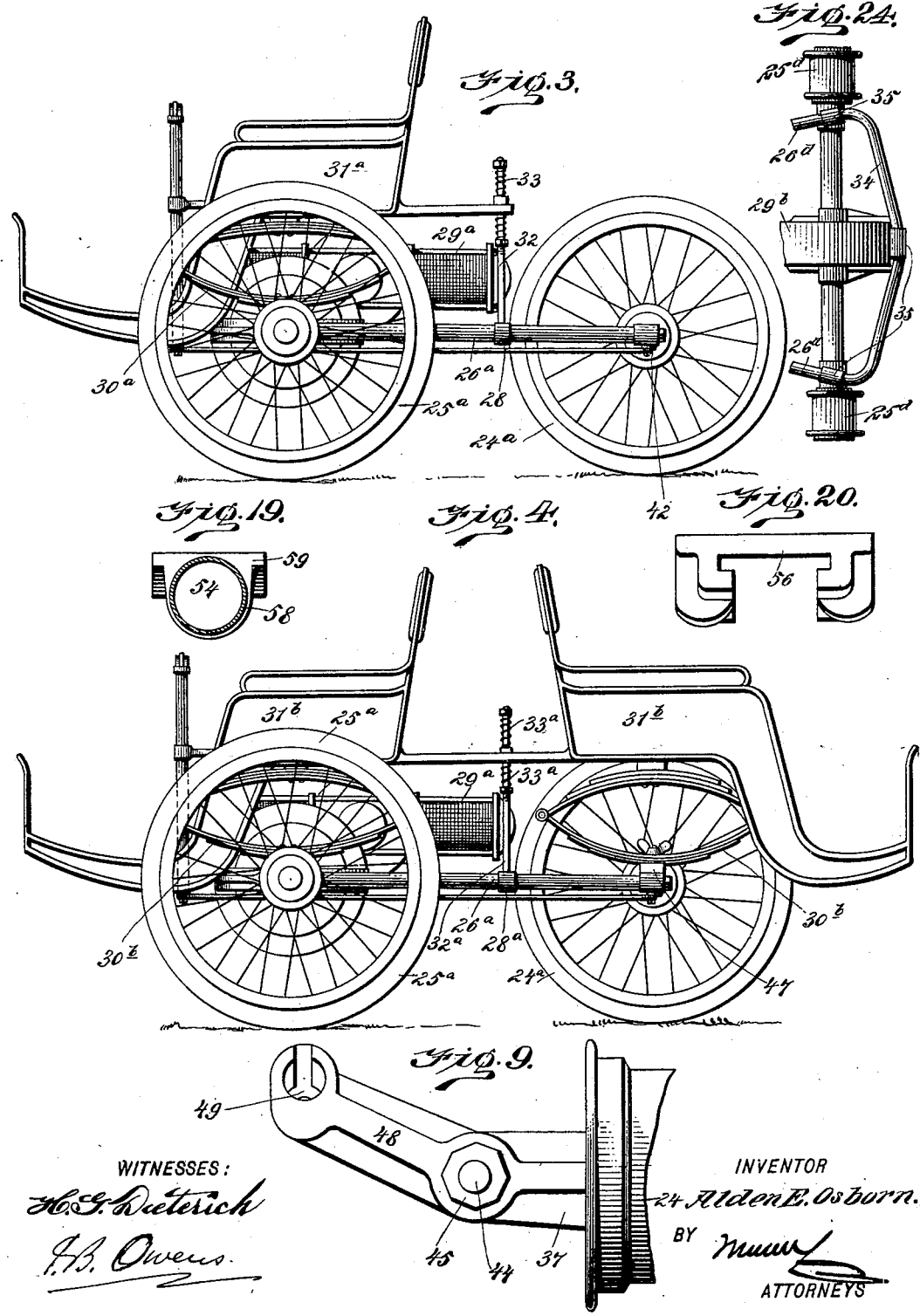

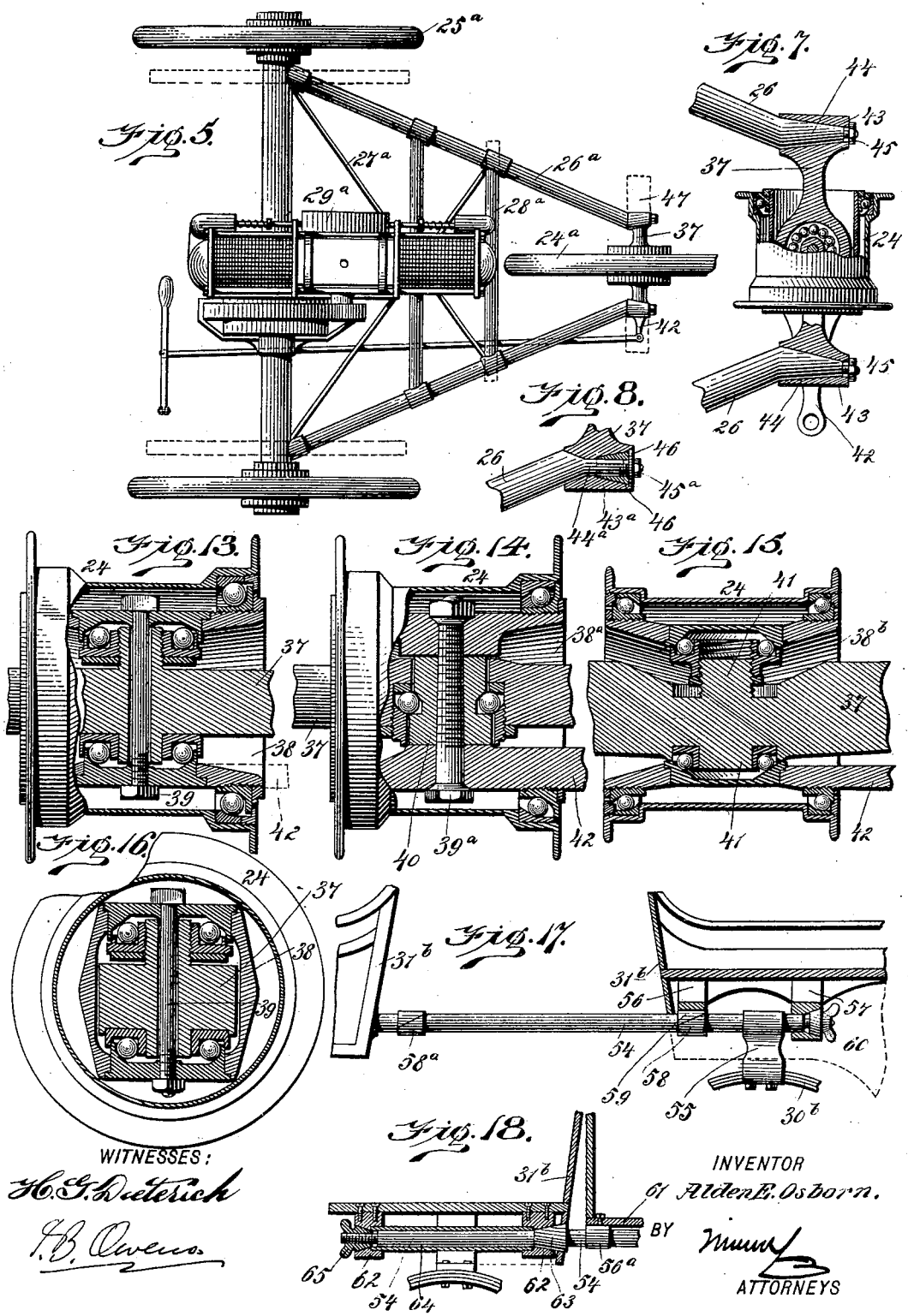

UNITED STATES PATENT OFFICE.

ALDEN E. OSBORN, OF NEW YORK, N. Y.

AUTOMOBILE VEHICLE.

SPECIFICATION forming part of Letters Patent No. 680,668, dated August 13, 1901.

Application filed September 6, 1900. Serial No. 29,170. (No model.)

*To all whom it may concern:*

Be it known that I, ALDEN E. OSBORN, a citizen of the United States, and a resident of the city of New York, borough of the Bronx, county and State of New York, have invented a new and Improved Automobile Vehicle, of which the following is a full, clear, and exact description.

This invention relates to various improvements in the framing and other parts of motor or automobile vehicles whereby the heavy curved tubing and dangerous front fork hitherto used in three-wheeled frames are done away with and its cost is greatly reduced.

It also relates to means whereby seats and wagon-bodies may be effectively and gracefully mounted and also changed from one position to another to convert the vehicles accordingly.

The invention further contemplates improvements in the means for mounting and operating the steering-wheel, all of which will be described hereinafter and defined in the claims.

Reference is to be had to the accompanying drawings, forming a part of this specification, in which similar characters of reference indicate corresponding parts in all the figures.

Figure 1 is a side view of a two-seated vehicle embodying some of the features of my invention. Fig. 2 is a plan of the same excepting that the body is removed. Fig. 3 is a side view of another form of the frame. Fig. 4 is a side view of still another form of the frame. Fig. 5 is a plan view of the device in Fig. 3, excepting that the seat is removed. Fig. 6 is a side view showing a wagon-body mounted in the frame shown in Figs. 3, 4, and 5. Fig. 7 is a partial plan and section of the steering-wheel gear. Fig. 8 is a detail section of a modification. Fig. 9 is a view of a means of mounting the springs. Fig. 10 is a view of the part that works with the device of Fig. 9, whereby the springs are sustained. Fig. 11 is a sectional view of the part shown in Fig. 9. Fig. 12 is a further view of the part shown in Fig. 10. Fig. 13 is a sectional view of the hub of the steering-wheel. Fig. 14 is a sectional view of a modification of the same. Fig. 15 is a sectional view of a modification of the same. Fig. 16 is a sectional view of the form shown in Fig. 13. Fig. 17 is a detail view showing one way of removably attaching a seat for a third or fourth person. Fig. 18 is a detail of another way of attaching said additional seat. Figs. 19 and 20 are details of devices entering into Figs. 17 and 18. Fig. 21 is a side view of a further form of framing, and Figs. 22, 23, and 24 are details of the same.

In Figs. 1 and 2 the vehicle has a single front wheel 24, which constitutes the steering or pilot wheel, and two rear wheels 25, serving as traction-wheels and driven by a motor 29, which may be of any form. The frame is triangular in general contour and is composed of main side bars 26, joined to the front and rear axles and braced by cross-bars 28 and diagonal tie-rods 27. Springs 30 are supported on the front and rear axles and in turn sustain a body 31, arranged with seats for one or two persons, as desired.

In Figs. 3, 4, 5, and 6 the two front wheels $25^a$ are traction-wheels driven by a motor $29^a$, and the single rear or trailing wheel $24^a$ is the pilot-wheel. The framing is essentially the same as in Figs. 1 and 2, except that it is reversed, and it therefore has side bars $26^a$, cross-bars $28^a$, and diagonal tie-rods $27^a$. In Fig. 3 the vehicle has a seat $31^a$ over the front axle, and this seat is sustained on elliptical springs $30^a$ at the front and by coil-springs 33 encircling rods 32, standing on the frame at the rear of the seat. In Fig. 4 the vehicle has two seats $31^b$, the front for two persons and the rear for one person. The seats $31^b$ are sustained by elliptical springs $30^b$ on the front and rear axles and by coil-springs $33^a$ on rods $32^a$ between the seats. In Fig. 6 the vehicle has a wagon-body $31^c$, supported on the frame by elliptical springs $30^c$. These views show the various forms that my invention may assume and illustrate the adaptability of the single form of frame to many diverse styles of vehicles.

Figs. 21, 22, 23, and 24 illustrate further improvements in the framing, which contemplate a duplex structure adaptable to heavy work. This framing has two side bars $26^d$ at each side arranged one above the other. At the rear these side bars are curved around rearward of the axles, two below and two above the same, curved extensions 34 joining the side bars in horizontal pairs and being fastened to the rear axle and to the motor or motor-gearing 29 by clips 35. At the front the side bars 26ᵈ are joined at each side in pairs by connecting-castings 36, into which the ends of the bars are fitted and secured. On the castings 36 the elliptical springs 30ᵈ are mounted, and these carry the wagon body or seats, part of which is indicated at 31ᵈ in Fig. 21.

The hub of the pilot or steering wheel is mounted on a stationary axle 37 by various devices, as shown in Figs. 13 and 16 and 14 and 15. In Figs. 13 and 16 the hub is fitted with ball-bearings to turn around a cylindrical shell 38, which is fitted within the hub. The shell 38 is held by a pin 39 to oscillate on the axle 37 around the axis of the pin, the pin passing transversely through the axle and the shell being fitted with ball-bearings, which sustain it, and consequently the wheel itself, on the axle. The shell 38 forms, therefore, a supplemental axle, and this in turn oscillates on the main axle, carrying with it the pilot-wheel, whereby to swerve the same and steer the vehicle. In Fig. 14 the shell 38ᵃ, carrying the pilot-wheel hub, is mounted to oscillate in the axle 37 by means of an interior stub-shaft or journal 40, which is fitted by ball-bearings to turn in a cavity in the axle 37, a pin or bolt 39ᵃ being passed through the shell and stub-shaft to hold them together. In Fig. 15 the shell 38ᵇ, carrying the wheel-hub, is fitted by ball-bearings to turn on diametrically opposite stubs 41, formed on the axle 37 and disposed transversely thereto. In all forms of the steering device an arm 42 is attached to the shell 38, 38ᵃ, or 38ᵇ, and by swinging this arm the shell may be turned whereby to turn the pilot-wheel. Any desired means may be connected with the arm 42 to facilitate turning the same at the will of the driver of the vehicle, such means therefore extending to the body portion in ready reach of the person therein.

In the forms of the invention shown in Figs. 1, 2, 3, 4, 5, and 6 the steering-wheel axle 37 may be attached to the front ends of the side bars of the frame either as shown in Fig. 7 or in Fig. 8—in Fig. 7 by sockets 43, formed in the ends of the axle, and in which the tapered ends 44 of the side bars 26 are fastened by nuts working in the ends of the side bars, and in Fig. 8 by sockets 43ᵃ, in which the tapered ends 44ᵃ of the side bars 26 are fastened by a wedge or wedges 46, pushed into place by nuts 45ᵃ, working in the ends of the side bars. The nuts 45ᵃ may be provided with a flanged collar, (not shown,) the flange of which fits into grooves on the inside of the wedges 46, so that the wedges may be easily removed by removing the nuts. In both cases the axle 37 becomes a part of the frame, since it joins the side bars 26 thereof. In the form of the invention shown in Figs. 21, 22, 23, and 24 the axle 37 of the pilot or steering wheel is fastened at its ends to the connecting-castings 36 and serves to join these parts rigidly together, as shown in Fig. 22.

As shown in Figs. 1, 2, 4, 5, and 6, the springs 30, (and the exponents thereof,) which are located adjacent to the steering or pilot wheel, are mounted on extensions 47, projected from the ends of the axles 37 or from the side bars 26 of the frame. Figs. 9, 10, 11, and 12 show another means of supporting the springs at the pilot-wheel, which means consist in extensions 48, formed on the ends of the axle 37 and provided with inclined keyhole-slots 49 in their ends, wherein are respectively fitted correspondingly-shaped projections 50 on the holders 51 of the springs. Thumb-screws 52 are provided for the projections 51 and serve to clamp the projections against walls 53, formed at the ends of the slots 49. By these screws the spring-holders 51 are kept in place.

In the form of the invention shown in Fig. 4 the rear seat 31ᵇ may be made removable, and in this case it is fastened by the devices shown in Figs. 17, 18, 19, and 20. This means comprises bars 54, which are fastened to the front seat and to the rear springs 30ᵇ by clips 55. The rear seat has socket-pieces 57 thereon, which receive the ends of the bars 54 and in which the bars are held by nuts 60, screwing on the bars. Diagonal guideways 56 are fastened to the rear seat forward of the socket-pieces 57 and are engaged by the wedge-shaped ears 59 on collars 58, fastened to the bars 54, whereby the bars and guideways are secured together. A wagon-body 31ᵉ may be fitted over the front seat and used in place of the rear seat 31ᵇ, as shown in Fig. 18, and this is held in place by the same devices shown in Fig. 17, to which are added an extra collar 58ᵃ and guideway 56ᵃ. (See Figs. 17 and 18.) The bars 54 are fastened in the front seat (see Fig. 18) by socket-pieces 62, held by the seat and receiving conical parts 63 on the bars 54. Brace-sleeves 64 extend between the socket-pieces 62, and nuts 65, working on the ends of the bars 54, serve to tighten the various parts together.

Having thus described my invention, I claim as new and desire to secure by Letters Patent—

1. An automobile vehicle having a long axle, a short axle, a duplex frame comprising upper and lower sections disposed respectively above and below the long axle and fastened thereto, each section being connected in rear of the long axle by curved extensions and connections extending between the upper and lower sections at each side of the vehicle and to which the short axle is fastened.

2. A vehicle having frame side bars, and an axle formed with sockets in its ends, in which sockets the ends of the frame side bars are fitted and secured.

3. In a vehicle, an axle provided with a tapering socket in each end, and frame side bars having tapering ends fitting in the sockets of the axle, and means for securing the ends of the frame in said sockets, substantially as described.

4. A vehicle having a duplex frame formed of upper and lower sections, each section having its bars connected in rear of the rear axle, connections extending between the front ends of the sections at each side of the frame, and an axle fastened rigidly to the connections and forming a part of the frame.

5. A vehicle, a support, an arm or extension projecting from the support and formed with a slot or recess therein, a spring-holder having a stud fitting in the slot or recess, and means for securing said stud in the said recess or slot.

6. A vehicle having a frame, a stationary axle fastened thereto and having an arm or extension projected beyond the frame, and a spring-holder carried on the arm or extension.

7. In a vehicle, means for removably joining two parts thereof, comprising a bar having one end connected to one part and having near its other end a member formed with wedge-shaped or diagonal ears, a guideway fastened to the other part and receiving the said ears, and means for forcing and holding the ears into the guideway.

8. A vehicle having a bar serving removably to carry a seat or other part, the bar having an enlargement, two socket-pieces fastened to the vehicle and into which the bar is extended, the enlargement bearing into one socket-piece, and means at the other socket-piece for holding the bar engaged therewith.

9. In a vehicle, the combination with the front and rear seats, of bars having one end secured to the front seat, and provided near their other ends with wedge-shaped ears, socket-pieces on the rear seat and with which the ends of the bars engage, diagonal guideways also on the rear seat and with which the said ears engage, and nuts on the ends of the bars, substantially as described.

10. In a vehicle, the combination of a frame, a short axle having at its ends means for fixedly securing it to the frame, a shell, a pin passing through the shell and axle at the center of length thereof, ball-bearings between the shell and axle, a wheel having its hub mounted on the shell, and ball-bearings between the shell and hub, substantially as described.

11. In a vehicle, the combination with an axle adapted to have its ends fixedly secured to a frame, and provided with a cavity at the center of length, a stub-shaft mounted to turn in the cavity of the axle, a shell, a pin passing through the shell and stub-shaft, and a wheel having its hub mounted on the shell, substantially as described.

12. In a vehicle, the combination with frame-bars, of an axle provided at its ends with sockets in which the ends of the frame-bars are secured, a shell mounted on the axle to oscillate on a transverse axis, and a wheel having its hub mounted on the shell, substantially as described.

13. In a vehicle, the combination of an axle provided with an arm having a keyhole-slot, a spring-holder, provided with a projection fitting in said slot, and means for locking the projection in the slot, substantially as described.

14. In a vehicle, the combination with a long axle having a wheel at each end, frame-bars having one end secured to the said axle and converging toward each other at their other ends, a short axle having sockets at its ends in which the ends of the said converging bars are secured, a shell mounted to turn on an axis transverse to the axle, and a wheel having its hub mounted on the shell, substantially as described.

In testimony whereof I have signed my name to this specification in the presence of two subscribing witnesses.

ALDEN E. OSBORN.

Witnesses:
I. B. OWENS,
JNO. M. RITTER.